United States Patent [19]

Fu

[11] Patent Number: 5,857,566

[45] Date of Patent: Jan. 12, 1999

[54] PACKAGE FOR STORING DISKETTES WITH DIFFERENT DIMENSIONS

[76] Inventor: Hsin-Yu Fu, No. 36, Lane 266, Fute 1st Rd., Hsichih Chen, Taipei Hsien, Taiwan

[21] Appl. No.: 62,124

[22] Filed: Apr. 17, 1998

[51] Int. Cl.[6] .................................................. B65D 85/57
[52] U.S. Cl. ................................ 206/307.1; 206/308.3; 312/9.58
[58] Field of Search ............................... 206/307, 307.1, 206/308.1, 308.3, 309, 313; 312/9.58

[56] References Cited

U.S. PATENT DOCUMENTS

| | | | |
|---|---|---|---|
| 4,875,743 | 10/1989 | Gelardi et al. | 206/308.1 |
| 4,998,618 | 3/1991 | Borgions | 206/308.1 |
| 5,332,086 | 7/1994 | Chuang | 206/308.3 |
| 5,617,949 | 4/1997 | De Koning et al. | 206/308.3 |
| 5,617,950 | 4/1997 | Chung | 206/308.1 |
| 5,690,221 | 11/1997 | Yeh | 206/308.1 |
| 5,715,939 | 2/1998 | Yun-Ming | 206/308.1 |

*Primary Examiner*—Jim Foster
*Attorney, Agent, or Firm*—Peterson, Wicks, Nemer & Kamrath, P.A.

[57] ABSTRACT

A package for storing diskettes with different dimensions is disclosed. The package includes a casing and a tray pivatally and receivably engaged with the casing. The casing is composed of a top panel, a bottom panel, and two side panels in connection with each other and extending between the top panel and the bottom panel. The tray defines a bottom wall, two opposed side walls and a rear wall. The rear wall of the tray has a plurality of spaced stoppers formed thereon. The two opposed side walls of the tray respectively have an elastic strip mounted thereon for grippingly securing the diskettes disposed on the bottom wall. Each of the elastic strips has a rib longitudinally formed on an outer periphery thereof for separating an upper diskette from a lower diskette. Additionally, each of the opposed side walls of the tray has an overhang formed at a top edge thereof for restricting the diskette.

4 Claims, 5 Drawing Sheets

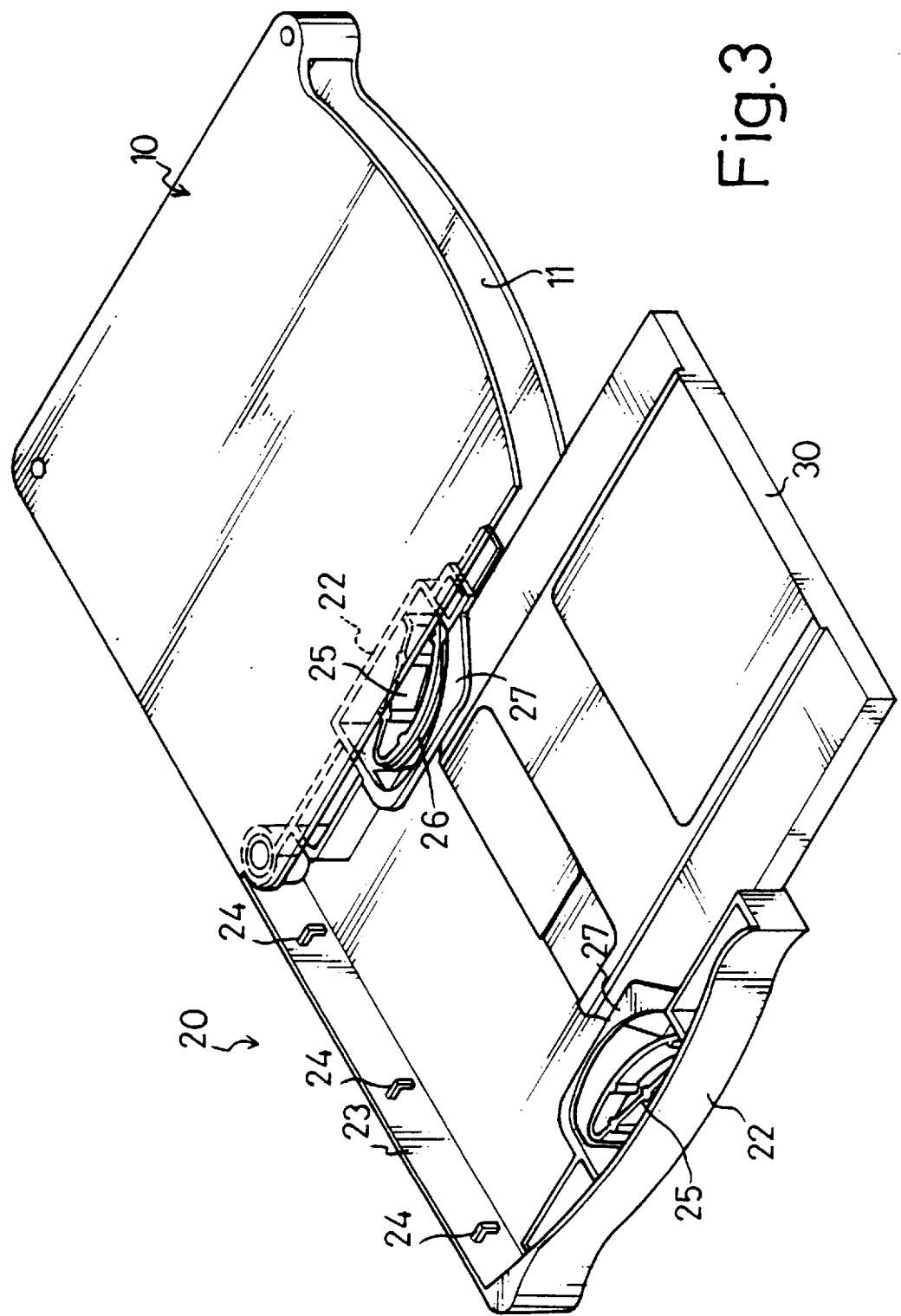

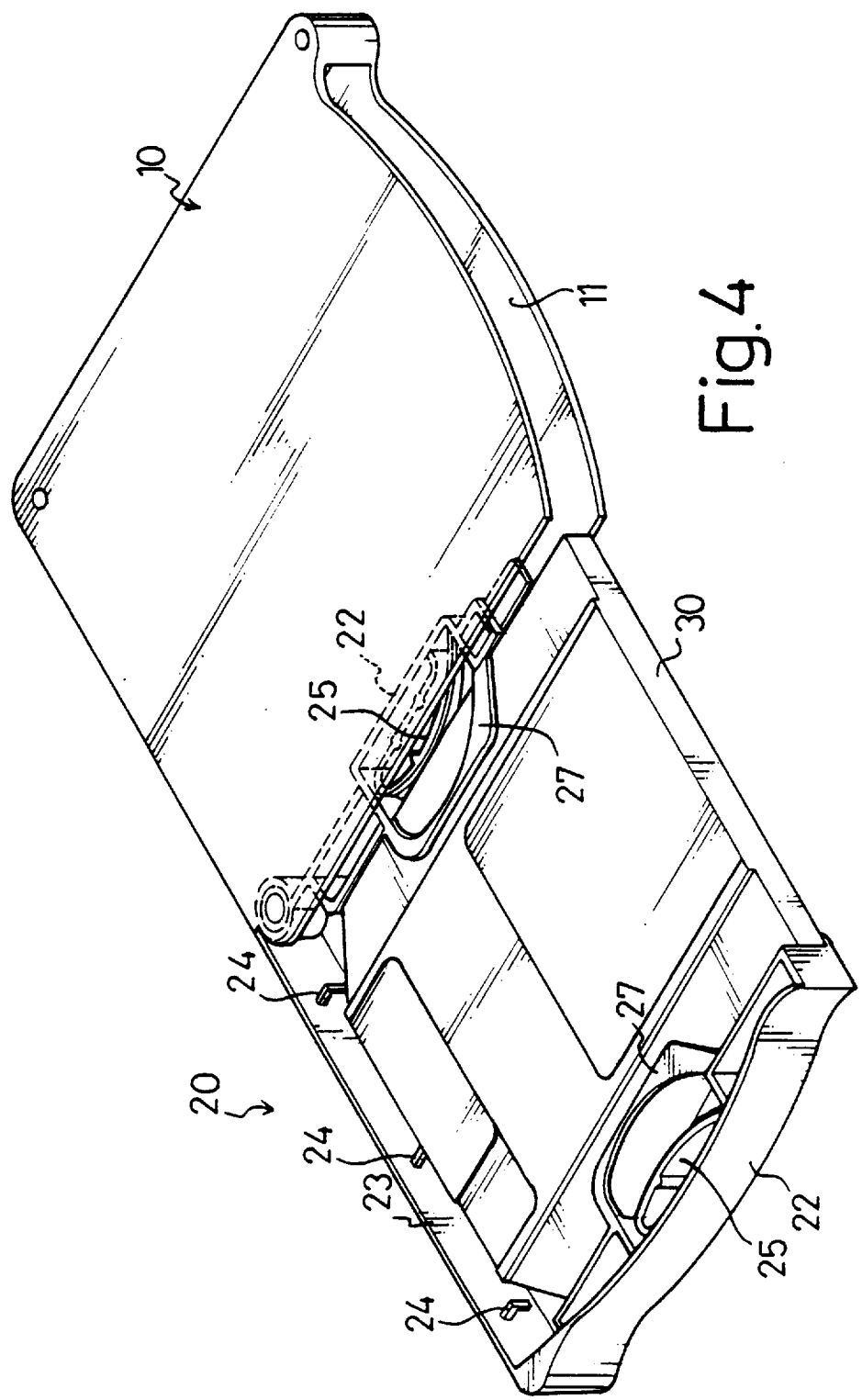

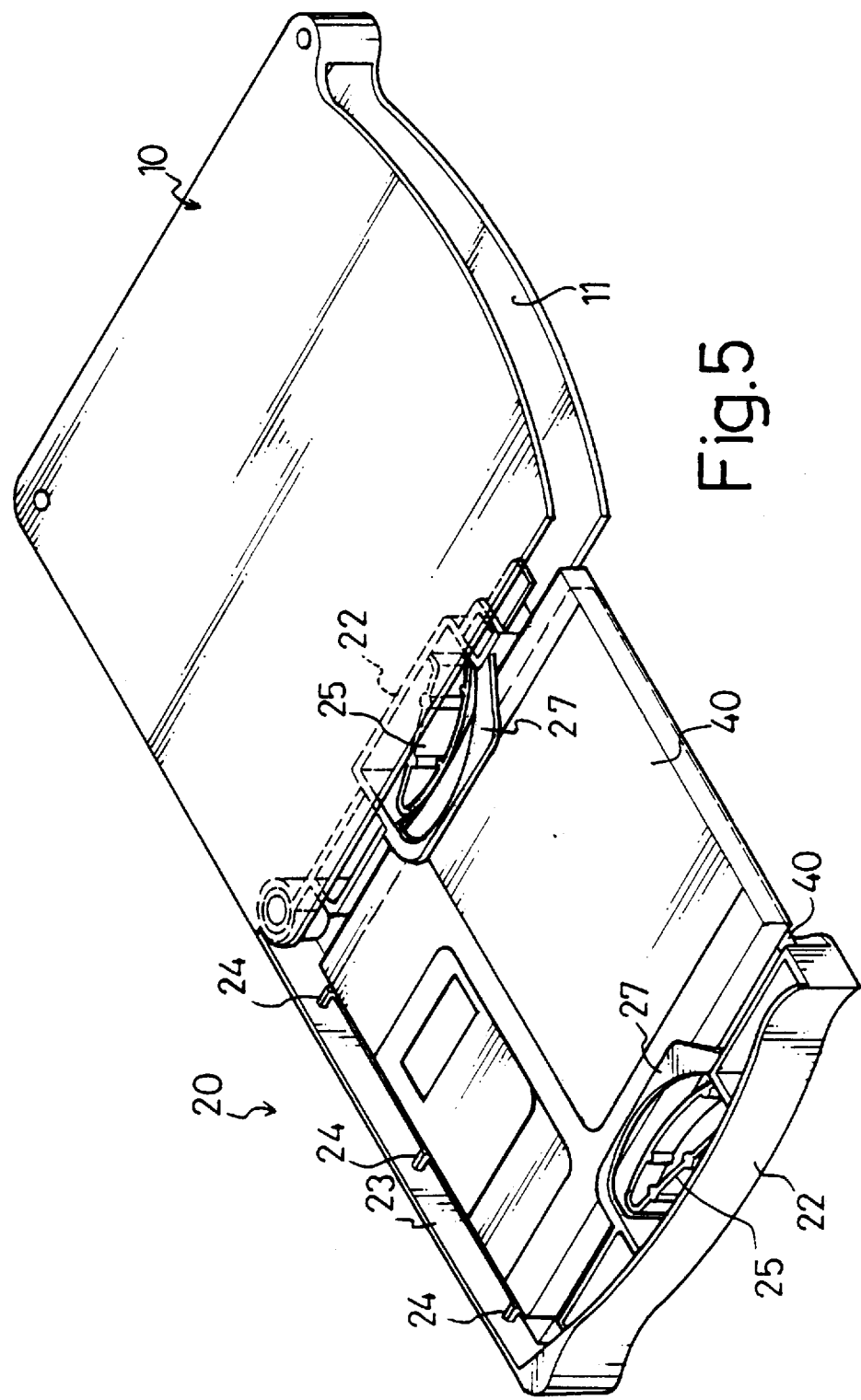

PACKAGE FOR STORING DISKETTES WITH DIFFERENT DIMENSIONS

BACKGROUND OF THE INVENTION

1. Field of the Invention

The present invention relates to a package for storing diskettes, and more particularly to a package which can store diskettes with different dimensions.

2. Description of Related Art

With the advance of computer technology, the speed of a Central Processing Unit (CPU), the capacity of a memory and the capacity of a hard disk have each been greatly increased. Comparing with the hard disk which is housed in a disk drive for storing information in a computer system, a diskette is more useful for transferring data from one computer to another. Nowadays, various diskettes having different sizes and different memory capacities have been developed, such as a 3.5-inch diskette, an MO, a ZIP, and an LS120 diskette. To protect these diskettes, a package is often used. However, a conventional package for storing diskettes has a disadvantage that it is not adapted for storing diskettes with different dimensions.

The present invention provides an improved package to mitigate and/or obviate the aforementioned problems.

SUMMARY OF THE INVENTION

The main object of the present invention is to provide a package which can store diskettes with different dimensions.

Other objects, advantages and novel features of the invention will become more apparent from the following detailed description when taken in conjunction with the accompanying drawings.

BRIEF DESCRIPTION OF THE DRAWINGS

FIG. 3 is a schematic view showing an insertion of a diskette into a tray of the package in accordance with the present invention;

FIG. 4 is a schematic view showing disposition of a wide and thick diskette in the tray of the package in accordance with the present invention;

FIG. 5 is a schematic view showing a disposition of two diskettes in the tray of the package in accordance with the present invention.

DETAILED DESCRIPTION OF PREFERRED EMBODIMENT

Figure 1:
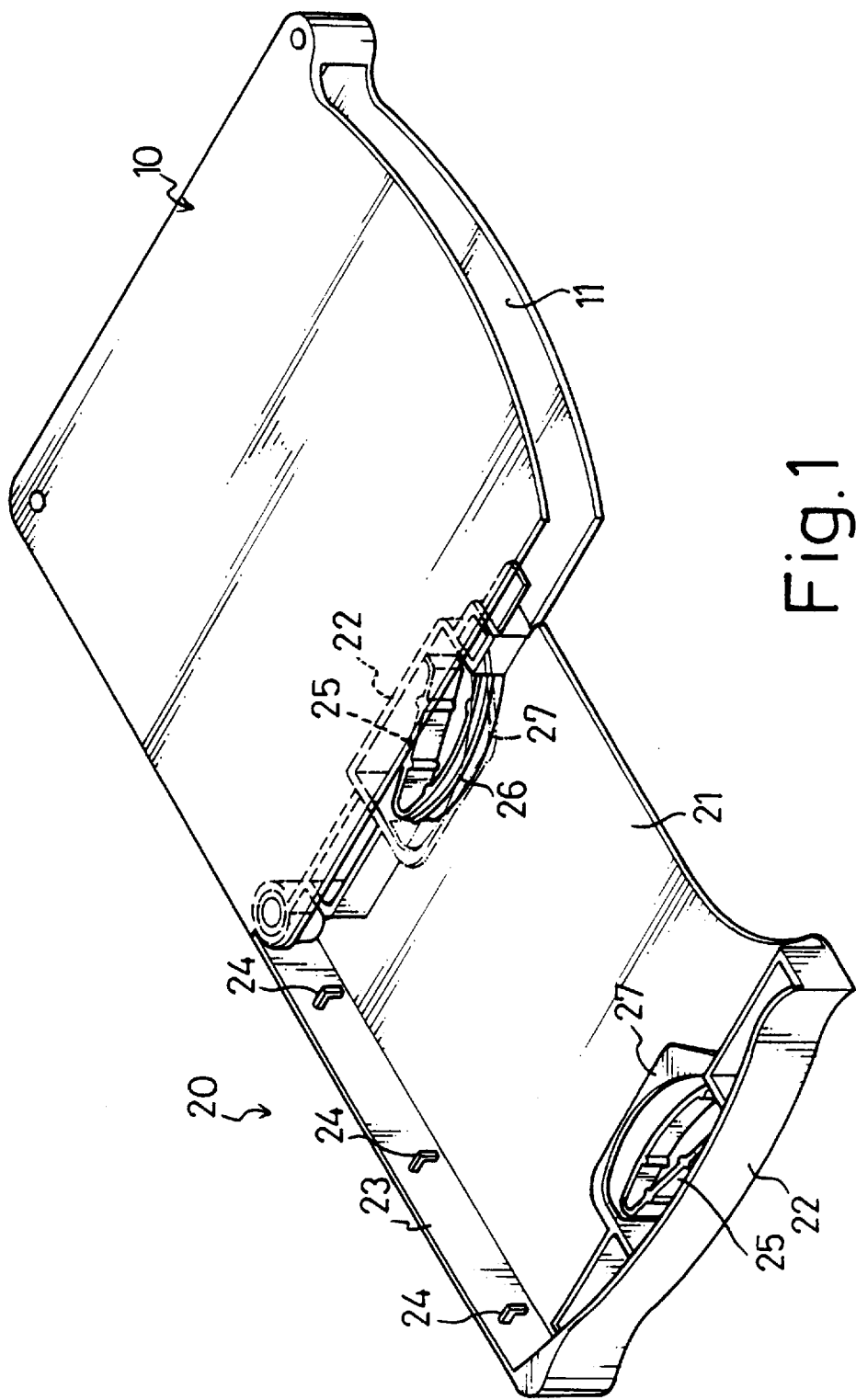
FIG. 1 is a perspective view of a package for storing diskettes with different dimensions in accordance with the present invention.
Figure 2:
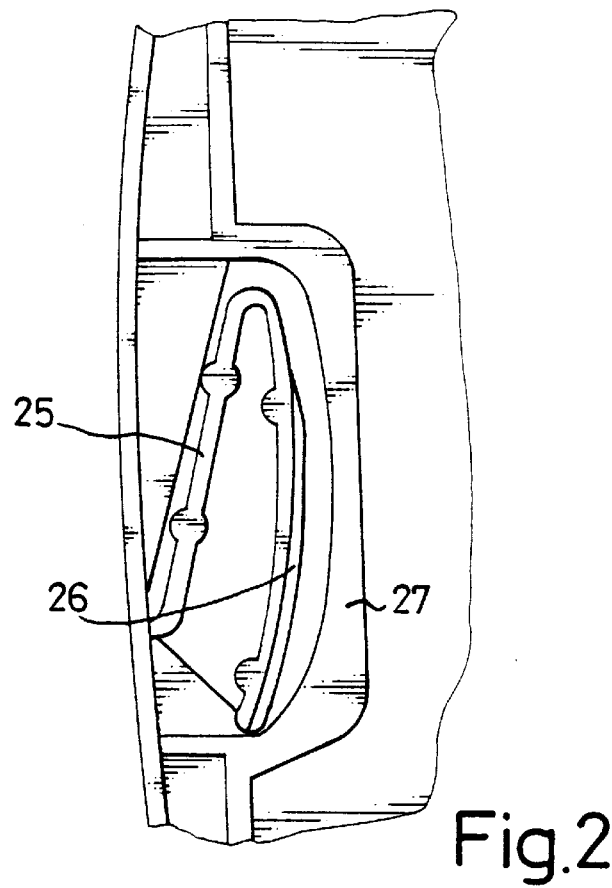
FIG. 2 is a partial top view showing an elastic strip of the package for storing diskettes with different dimensions in accordance with the present invention.

Referring to FIG. 1, a package for storing diskettes with different dimensions in accordance with the present invention comprises a casing 10 and a tray 20 for accommodating diskettes. The casing 10 includes a top panel and a bottom panel (not numbered) defining a space 11 therebetween and two side panels (not numbered) extending between the top panel and the bottom panel and in connection with each other. The tray 20 is pivotally engaged with a distal end of one of the two side panels and is able to be received in the space 11 of the casing 10. The tray 20 includes a bottom wall 21, two opposed side walls 22 and a rear wall 23. The rear wall 23 has a plurality of spaced stoppers 24 formed on an inner periphery thereof. The two opposed side walls 22 have a pair of elastic strips 25 respectively and opposedly mounted to an inner periphery thereof. Each of the elastic strips as is bent as an inverted-U (see FIG. 2) and has a rib 26 longitudinally formed on an outer periphery thereof. Additionally, each of the two opposed side walls 22 of the tray 20 has an overhang 27 formed at a top edge thereof for restricting the diskettes received in the tray 20.

The package in accordance with the present invention is configured to store diskettes with different dimensions and different capacities, such as a 3.5-inch diskette, an MO, a ZIP or an LS120 diskette. For example, referring to FIG. 3, when a diskette 30 of relatively large size and thickness is to be stored, it can be inserted into the tray 20. During the insertion of the diskette 30, the pair of elastic strips 25 are compressed by the diskette 30 because, as illustrated, a width of the diskette 30 is relatively larger than a distance between the pair of elastic strips 25. Then the diskette 30 can be continuously urged toward the rear wall 23 by the strips 25 until it abuts the plurality of spaced stoppers 24 of the rear wall 23, meanwhile the pair of elastic strips 25 will grippingly secure the diskette 30 in the tray 20, as shown in FIG. 4.

Figure 6:
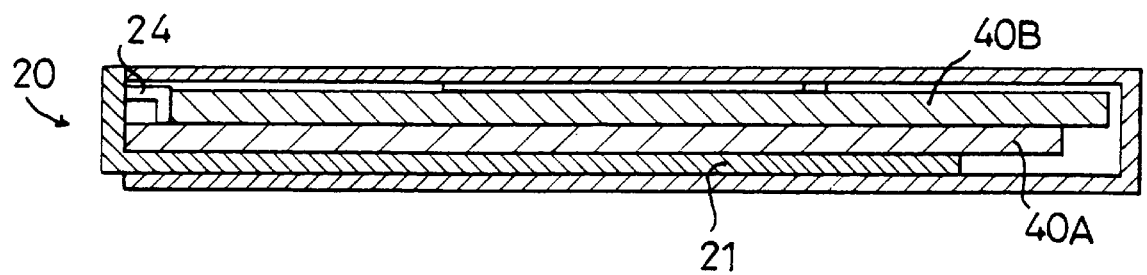
FIG. 6 is a sectional view showing a disposition of two diskettes in the tray of the package in accordance with the present invention.

In accordance with an alternative embodiment of the present invention, the package also can be used to store two diskettes 40A, 40B of relatively small size and thickness. FIG. 5 and FIG. 6 respectively show the disposition of the two diskettes 40A, 40B in the tray 20 of the package. The first diskette 40A can be inserted into the tray 20 along the two opposed side walls 22 until it abuts the rear wall 23 of the tray 20. It is to be noted that the first diskette 40A has a respective edge portion retained by the plurality of spaced stoppers 24, as shown in FIG. 6. During the insertion of the first diskette 40A, the pair of elastic strips 25 is compressed, and the pair of ribs 26 of the elastic strips 25 contact respective sides of the diskette 40A, thereby securing the first diskette 40A in the tray 20. Then the second diskette 40B is inserted into the tray 20 via two opposed edges of the diskette 40B being received between the ribs 26 and respective overhangs 27 of the two opposed side walls 22. By abutting the plurality of spaced stoppers 24 of the rear wall 23, the second diskette 40B will be stopped and offset with respect to the first diskette 40A, as shown in FIG. 6, thereby facilitating removal by the user. Further, the second diskette 40 will be secured in the tray 20, since a distance between each rib 26 and the respective overhang 27 is substantially equal to a thickness of the second diskette 40B. Additionally, the second diskette 40B can be separated from the first diskette 40A by the pair of ribs 26. In this way, two diskettes 40A, 40B can be overlappedly accommodated in the tray 20. By pivoting the tray 20 into the casing 10, the diskettes 40A, 40B can be stored.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A package for storing diskettes with different dimensions, comprising:

a casing composed of a top panel, a bottom panel, and two side panels in connection with each other and extending between the top panel and the bottom panel; and a tray pivotablly connected with and selectively received within the casing, said tray defining a bottom wall, two opposed side walls and a rear wall, said two opposed side walls each having an elastic strip securely mounted thereon for grippingly securing the diskettes disposed on the bottom wall.

2. A package for storing diskettes with different dimensions as claimed in claim 1, wherein each of said elastic strips has a rib longitudinally formed on an outer periphery thereof for separating an upper diskette from a lower diskette.

3. A package for storing diskettes with different dimensions as claimed in claim 1, wherein said rear wall of the tray has a plurality of spaced stoppers formed thereon.

4. A package for storing diskettes with different dimensions as claimed in claim 1, wherein each of said opposed side walls of the tray has an overhang formed at a top edge thereof for restricting the diskettes.

* * * * *